(12) United States Patent
Ohara

(10) Patent No.: US 7,982,810 B2
(45) Date of Patent: Jul. 19, 2011

(54) PANEL-TYPE IMAGE DISPLAY DEVICE AND LIQUID CRYSTAL TELEVISION

(75) Inventor: Hisayuki Ohara, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1188 days.

(21) Appl. No.: 11/707,319

(22) Filed: Feb. 17, 2007

(65) Prior Publication Data

US 2007/0200961 A1 Aug. 30, 2007

(30) Foreign Application Priority Data

Feb. 22, 2006 (JP) .................................. 2006-045511

(51) Int. Cl.
- H04N 5/445 (2011.01)
- H04N 5/50 (2006.01)
- H04N 9/74 (2006.01)
- H04N 3/14 (2006.01)
- H04N 9/12 (2006.01)

(52) U.S. Cl. ........ 348/790; 348/563; 348/569; 348/590; 348/797

(58) Field of Classification Search .................. 348/790, 348/791, 797, 569, 563, 589, 590
See application file for complete search history.

(56) References Cited

U.S. PATENT DOCUMENTS

| | | | |
|---|---|---|---|
| 4,656,507 A | | 4/1987 | Greaves et al. |
| 5,367,616 A | | 11/1994 | Yoshida et al. |
| 5,880,728 A | * | 3/1999 | Yamaashi et al. ............. 715/803 |
| 5,969,767 A | * | 10/1999 | Ishikawa et al. ............. 348/564 |
| 6,335,764 B1 | * | 1/2002 | Hashimoto et al. ........... 348/565 |
| 6,556,253 B1 | * | 4/2003 | Megied et al. ................ 348/565 |
| 6,664,970 B1 | | 12/2003 | Matsushita |
| 6,714,253 B2 | * | 3/2004 | Kim et al. ...................... 348/556 |
| 6,885,406 B2 | * | 4/2005 | Yui et al. ........................ 348/564 |
| 7,119,849 B2 | * | 10/2006 | Yui et al. ........................ 348/564 |
| 7,463,307 B2 | * | 12/2008 | Cheng ............................ 348/448 |

(Continued)

FOREIGN PATENT DOCUMENTS

EP 1051033 A 11/2000

(Continued)

OTHER PUBLICATIONS

Japanese Notice of the reason for refusal, dated Feb. 6, 2008.

(Continued)

*Primary Examiner* — Brian Yenke
(74) *Attorney, Agent, or Firm* — Yokoi & Co., U.S.A, Inc.; Toshiyuki Yokoi

(57) ABSTRACT

A panel-type television whose colors and image qualities of OSD portions are kept intact and the qualities of images other than the OSD portions are adjusted is provided. The panel-type television includes an image quality adjustment circuit 30a that performs a specified image quality adjustment processing on input image signals; a delay circuit 30b that delays input image signals by the time needed for the image quality adjustment circuit 30a to perform image quality adjustment processing; and a switching 30c that switches between the image quality adjustment circuit 30a and the delay circuit 30b so that image signals are input to either of the circuits according to the control of a microcomputer 60, wherein the microcomputer 60 inputs image signals for OSD display areas to the delay circuit 30c and image signals other than those for OSD display areas to the image quality adjustment circuit 30a.

1 Claim, 9 Drawing Sheets

U.S. PATENT DOCUMENTS

| | | | |
|---|---|---|---|
| 7,486,337 B2 * | 2/2009 | Bian | 348/589 |
| 7,567,301 B2 * | 7/2009 | Higashi | 348/671 |
| 7,583,324 B2 * | 9/2009 | Hsieh et al. | 348/716 |
| 7,593,062 B2 * | 9/2009 | Higashi | 348/556 |
| 7,616,264 B1 * | 11/2009 | Greenberg | 348/584 |
| 7,626,638 B2 * | 12/2009 | Mitsuya et al. | 348/581 |
| 7,633,554 B2 * | 12/2009 | Sloo et al. | 348/564 |
| 7,636,131 B2 * | 12/2009 | Hsieh et al. | 348/716 |
| 7,675,576 B2 * | 3/2010 | Liao et al. | 348/584 |
| 7,742,107 B2 * | 6/2010 | Won | 348/569 |
| 7,768,576 B2 * | 8/2010 | Yui et al. | 348/564 |
| 7,782,399 B2 * | 8/2010 | Lee et al. | 348/557 |
| 7,804,543 B2 * | 9/2010 | Neal et al. | 348/569 |
| 2002/0051154 A1 * | 5/2002 | Aneja et al. | 358/1.9 |
| 2002/0171765 A1 * | 11/2002 | Waki et al. | 348/589 |
| 2003/0115613 A1 * | 6/2003 | Jang et al. | 725/151 |
| 2004/0001163 A1 * | 1/2004 | Park | 348/569 |
| 2005/0168483 A1 * | 8/2005 | Hirata | 345/629 |
| 2007/0146547 A1 * | 6/2007 | Komlev et al. | 348/584 |

FOREIGN PATENT DOCUMENTS

| | | |
|---|---|---|
| JP | 05-030386 | 2/1993 |
| JP | H07-225850 A | 8/1995 |
| JP | H09-252430 A | 9/1997 |
| JP | 10-079899 | 3/1998 |
| JP | 2001-306054 | 11/2001 |
| JP | 2002-344995 | 11/2002 |
| JP | 2005-026814 | 1/2005 |
| KR | 2002-0059544 A | 7/2002 |
| WO | 02/05547 A | 1/2002 |

OTHER PUBLICATIONS

Japanese Notice of the reason for refusal, dated Apr. 23, 2008.

The extended European search report dated Feb. 2, 2010.

* cited by examiner

PANEL-TYPE IMAGE DISPLAY DEVICE AND LIQUID CRYSTAL TELEVISION

CROSS-REFERENCES TO RELATED APPLICATIONS

The present application is related to the Japanese Patent Application No. 2006-045511, filed Feb. 22, 2006, the entire disclosure of which is expressly incorporated by reference herein.

BACKGROUND OF THE INVENTION (1) Field of the Invention

The present invention relates to a panel-type image display device and a liquid crystal television.

(2) Description of Related Art

Image signals input to panel-type image display devices, liquid crystal television s, and plasma televisions and so on are displayed on the screen after image qualities, such as contrast, white balance, brightness are adjusted in image quality control circuits. In addition, not only normal image signals but also on-screen display (OSD) signals that are superimposed onto the normal image signals are displayed on the TV screen. OSD signals are signals for a menu screen that are used for image quality adjustment and sound quality adjustment, signals that are used to display black masked portions, which appear when images with aspect ratio of 4 to 3 are displayed on screens for images with aspect ratio of 16 to 9, on both right and left sides of the TV screen, and signals that are used to display black masked portions, which appear when images with aspect ratio of 16 to 9 are displayed on screens for images with aspect ratio of 4 to 3, on both upper and lower sides of the TV screen and the like.

In Japanese Patent Laid-Open No. H10-079899, a television wherein on-screen display signals are adjusted so that on-screen displays are not adversely affected by image quality adjustments has been disclosed. In this patent reference, the adjustment of the on-screen display signals is performed in such a way as to compensate the influences of the image quality adjustments by use of an on-screen display control circuit.

In Japanese Patent Laid-Open No. 2005-026814, an image display device has been disclosed, wherein the existence of a side panel 16 to 9 image signal is detected; the brightness level of the side panel 16 to 9 image signal is detected; the brightness level of the image signal is obtained; and at the same time the image quality compensation according to the detected result of the brightness level of the side panel and the detected result of the brightness level of the image signal is performed.

In above-mentioned conventional panel-type image display devices, liquid crystal televisions, and plasma televisions, however, there is often the case where a processing block wherein OSD signals are superimposed onto image signals is followed by another block wherein image adjustments are performed. In this case, there are problems in that not only the image qualities of the normal image signals but also those of the superimposed OSD signals are adjusted with the result that colors of OSD displays are changed.

As to the technologies described in Japanese Patent Laid-Open No. H10-079899, there is a possibility that if the amount of image quality adjustment is large, the level of OSD signals is saturated when an image quality compensation is performed on OSD signals and as a result, the intended OSD displays cannot be obtained.

BRIEF SUMMARY OF THE INVENTION

The present invention discloses a panel-type image display device and a liquid crystal television wherein colors and image qualities of OSD portions are kept intact and the qualities of images other than the OSD portions can be adjusted even if the panel-type image display device and the liquid crystal television are configured so that the procedure block to make OSD signals superimposed onto image signals is followed by the procedure block to perform image adjustments.

One aspect of the present invention provides a liquid crystal television comprising: a liquid crystal module that displays images on a screen of the liquid crystal module; a tuner that extracts TV broadcast signals of a channel selected from a TV broadcast signals received by an antenna and outputs the extracted signals; a scaler large scale integration (LSI) equipped with: a decoder that separates image signals and audio signals from input TV signals, and simultaneously decodes the image signals and extracts amounts of three primary color signal components, that is, amounts of R (red), G (green), and B (blue) components; a scaler that generates image data for one frame to be displayed in the liquid crystal module after performing scaling processing on input image signals in order to match the input image signals to a pixel number of the screen of the liquid crystal module; and an on-screen display (OSD) processing section that generates still images and superimposes the still images onto image signals after being supplied with data used to generate OSD signals; an image quality adjustment circuit that performs a specified image quality adjustment processing on the image signals input by the scaler LSI, and outputs the processed image signals to the liquid crystal module; and a microcomputer that controls the tuner, the scaler LSI, and the liquid crystal module, and simultaneously supplies an OSD processing section with data used to generate OSD signals, the liquid crystal television further including: a delay circuit that delays the image signals output by the scaler LSI by a time needed for the image quality adjustment circuit to perform image quality adjustment processing; and a switch that switches a connection between the image quality adjustment circuit and the delay circuit according to a control of the microcomputer so that the image signals are output from either of the image quality adjustment circuit or the delay circuit, the OSD processing section generates OSD signals used to display rectangular OSDs on the screen after being supplied with data used to generate OSD signals by the microcomputer and outputs the OSD signals superimposed onto the image signals; and the microcomputer generates information about OSD display area from a data used to generate the OSD signals after controlling the OSD processing section in order for OSDs to be displayed; controls the switch in order for the delay circuit to be connected so that the image signals for OSD display areas of the signals output by the scaler LSI are output without qualities of the image signals being adjusted; controls the switch in order for the image quality adjustment circuit to be connected so that the image signals that are not for the OSD display areas come out with the qualities image signals being adjusted; and displays the OSD images without the qualities image signals being adjusted and the images other than the OSD images with the qualities image signals being adjusted on the screen of the liquid crystal module.

Another aspect of the present invention provides a panel-type image display device, comprising: an image signal output unit that performs a specified image signal processing on input image signals and outputs a processed image signals; an image quality adjustment section that performs a specified processing on image signals output by the image signal output unit; and a panel-type display on which images based on the image signals output by the image quality adjustment section, the panel-type image display device further including a rectangle discrimination unit that can discriminate between image signals to be displayed inside a specified rectangular area on the panel-type display and image signals to be displayed outside the specified rectangular area and also can output discrimination signals; the image quality adjustment section has an image quality adjustment circuit, a delay output circuit, and a switching device; and the image quality adjustment circuit receives image signals output by the image output unit and performs a specified image processing on the image signals; the delay output circuit receives image signals output by the image signal output unit and delays the image signals by the time needed for the image quality adjustment circuit to perform image quality adjustment processing without performing any image quality adjustment on the image signals and outputs the delayed image signals; and the switching device switches between the image quality adjustment circuit and the delay output circuit so that image signals output by the image signal output unit pass through either the image quality adjustment circuit or the delay output circuit according to discrimination signals output by the rectangle discrimination unit.

In the present invention that is configured as mentioned above, the rectangle discrimination unit discriminates between image signals to be displayed inside a specified rectangular area on the panel-type display and image signals to be displayed outside the specified rectangular area and outputs discrimination signals, and the switching device switches between the image quality adjustment circuit and the delay output circuit so that image signals output from the image signal output unit pass through either the image quality adjustment circuit or the delay output circuit according to discrimination signals output by the rectangle discrimination unit. As a result, the delay output circuit receives image signals output from the image signal output unit and delays the image signals by the time needed for the image quality adjustment circuit to perform image quality adjustment processing. This is done without performing any image quality adjustment on the image signals and the delay output circuit outputs the delayed image signals. The image quality adjustment circuit receives image signals output by the image output unit and performs a specified image processing on the image signals and outputs the adjusted image signals, with the result that images are displayed on the panel-type display based on the image signals output from the image quality adjustment section.

In addition, the present invention can also provide a panel-type image display device that can display OSD portions with their image qualities kept intact even if image adjustment processing is performed in the panel-type image display device that is configured in such a way that the OSD processing section that superimposes the OSD signals onto image signals is located in front of the image quality adjustment circuit.

An optional aspect of the present invention provides a panel-type image display device, wherein: the image signal output unit has a function to generate on-screen display signals that are displayed in a rectangular box and output the on-screen display signals superimposed onto the image signals; and the rectangle discrimination unit discriminates the inside area of the rectangular box for the on-screen display signals as the rectangular area.

In the present invention that is configured as mentioned above, the areas in which OSDs are displayed are rectangular so that it is easy to discriminate between areas for normal image display and areas for OSD display. As a result, a panel-type image device can be provided in which effective image processing is performed with image qualities of OSD portions are kept intact.

Another optional aspect of the present invention provides a panel-type image display device, wherein the rectangle discrimination unit has a function to discriminate multiple rectangular areas.

In the present invention that is configured as mentioned above, even if multiple OSD signals are superimposed onto image signals, a panel-type image device can be provided in which discrimination processing to discriminate between areas for OSD display and areas for normal image display is performed.

Another optional aspect of the present invention provides a panel-type image display device, wherein the rectangle discrimination unit discriminates a logical sum of all the rectangular areas when discriminating multiple rectangular areas.

In the present invention that is configured as mentioned above, a panel-type image device can be provided in which discrimination processing to discriminate between areas for normal image display and areas for OSD display is easily performed.

Another optional aspect of the present invention provides a panel-type image display device, wherein the rectangular areas are non-image areas located in both right and left outsides of an image display area.

In the present invention that is configured as mentioned above, a panel-type image device can be provided in which black relieves of black masked portions on both right and left sides of the screen are suppressed. It is because image quality adjustment is not performed on image signals for black masked portions which appear on both right and left sides of the screen when images with aspect ratio of 4 to 3 are displayed on screens for images with aspect ratio of 16 to 9.

Another optional aspect of the present invention provides a panel-type image display device, wherein the rectangular areas are non-image areas located in both upper and lower outsides of an image display area.

In the present invention that is configured as mentioned above, a panel-type image device can be provided in which black relieves of black masked portions on both upper and lower sides of the screen are suppressed. It is because image quality adjustment is not performed on image signals for black masked portions which appear on both upper and lower sides of the screen when images with aspect ratio of 16 to 9 are displayed on screens for images with aspect ratio of 4 to 3.

Another optional aspect of the present invention provides a panel-type image display device, wherein the panel-type display is a liquid crystal module on a screen of which images are displayed.

In the present invention that is configured as mentioned above, a liquid crystal display device can be provided in which above-mentioned various effects are achieved.

Another optional aspect of the present invention provides a panel-type image display device, wherein the panel-type display is a plasma display panel-type module on a screen of which images are displayed.

In the present invention that is configured as mentioned above, a plasma display device can be provided in which above-mentioned various effects are achieved.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
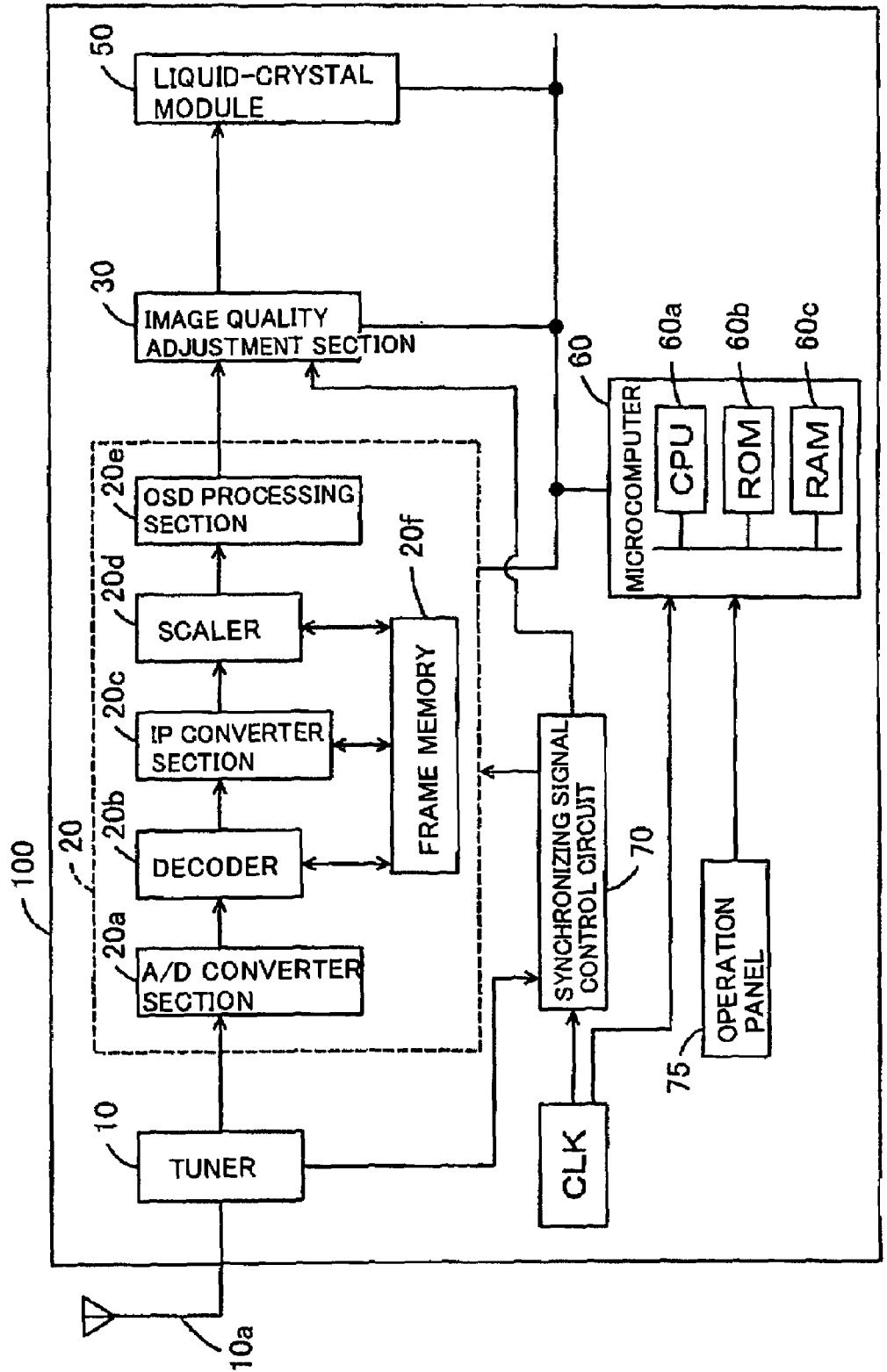
FIG. 1 is an exemplary illustration of a block schematic diagram of a panel-type television in accordance with one embodiment of the present invention.

An embodiment of the present invention will be described in the following order:

(1) A general constitution of a panel-type television in accordance with this embodiment
(2) Image quality adjustment processing
(3) A modified example related to the image quality adjustment processing
(4) Summary (1) A General Constitution of a Panel-Type Television in Accordance With This Embodiment:

FIG. 1 is a block diagram showing a constitution of a liquid crystal television 100 adopted as a panel-type television in accordance with the present invention. As shown in FIG. 1, the liquid crystal television includes a tuner 10, an image signal processing section 20, an image quality adjustment section 30, a liquid crystal module 50, and a microcomputer 60.

In this embodiment, although a liquid crystal television is described as an example of a panel-type display, an image display device equipped with a plasma display panel (PDP), a plasma television that display images on a PDP, an image display device equipped with a liquid crystal display panel or the like can be adopted as an example of a panel-type display device related to the present invention. It goes without saying that modularized devices such as a plasma display panel module and a liquid crystal module can be also adopted as examples of panel-type display devices.

In the above-mentioned configuration of this embodiment, the microcomputer 60 is directly connected to an oscillation circuit CLK, an operation panel 75, and a remote control signal receiving section (not shown in FIG. 1), and data corresponding to operations by users toward the operation panel 75 and so on can be input to the microcomputer 60. In addition, the microcomputer 60 is electrically connected to each section which constitutes the liquid crystal television 100. CPU 60a, that is, one of the components of the microcomputer 60, controls the whole behavior of the liquid crystal television 100 according to programs written in ROM 60b, and RAM 60c, that is, other components of the microcomputer 60, with the result that the liquid crystal television 100 properly acts as a television.

As shown in FIG. 1, the liquid crystal television 100 includes the tuner 10 that receives frequency signals from the antenna 10a. The tuner 10 is a publicly-known circuit used for an analog television. Received by the antenna 10a, analog TV broadcast signals (kinds of image signals) based on a specified broadcast system are input to the tuner 10. Then the tuner 10 extracts broadcast signals of a selected channel and generates and outputs intermediate frequencies.

Specified broadcast systems include PAL system, SECAM system, and NTSC system. Therefore, the tuner 10 can be a circuit that receives TV signals of multiple broadcast systems and generates intermediate frequencies. In this embodiment, it is assumed that the circuit of the tuner 10 has a so-called frequency synthesizer-type tuner built-in and is equipped with a high frequency amplifier, a local oscillation circuit, a mixer circuit and so on. Of course the tuner 10 can be a voltage synthesizer-type tuner.

The output signals from the tuner 10 are provided to the image signal processing section 20 that is controlled by the microcomputer 60. In this embodiment, it is assumed that the image signal processing section 20 is put into shape by an LSI (scaler LSI). The image signal processing section 20 includes an A/D converter section 20a, a decoder 20b, an IP converter section 20c, a scaler 20d, and an OSD processing section 20e. The image signal processing section 20 constitutes an image signal output unit that performs a specified image signal processing on input image signals.

The A/D converter section 20a converts the input image signals into digital signals. The decoder 20b decodes the input digital image signals and extracts the amounts of three primary color signal components, that is, the amounts of R (red), G (green), and B (blue) components. In addition, the decoder 20b separates image signals and audio signals and outputs the separated audio signals to an audio signal processing section (not shown in FIG. 1) to sound a speaker (not shown in FIG. 1).

The IP converter section 20c converts consecutive interlaced image signals to progressive image signals. The scaler 20d generates image data for one frame to be displayed in the liquid crystal module 50 after performing scaling processing on the input digital image signals in order to match the input digital image signals to the pixel number (aspect ratio m to n) of the screen of the liquid crystal module 50. Then, after the image data generated as mentioned above are sent to the liquid crystal module, the images based on the image data are displayed on the screen of the liquid crystal module 50.

The decoder 20b, the IP converter section 20c, and the scaler 20d are designed to use a frame memory 20f when performing their respective processing.

Image signals output from the scaler 20d are input to the OSD processing section 20e. The OSD processing section 20e has a function to display specified still images that are superimposed onto the image signals or display the specified still images instead of the image signals. The OSD processing section 20e is designed in such a way that it receives data such as textual information from the microcomputer 60 and generates still images based on the received data.

In addition, the tuner 10 outputs a synchronizing signal to a synchronizing signal control circuit 70 after separating the synchronizing signal. The synchronizing signal control circuit 70 outputs the synchronizing signal to the image signal processing section 20 and the image quality adjustment section 30 in exact timing with a clock signal of the oscillation circuit CLK in order to synchronize the image signal processing section 20 and the image quality adjustment section 30.

The image quality adjustment section 30 performs color adjustments such as contrast adjustment, tint adjustment, brightness adjustment, and flesh tone correction; black and white extension adjustment; delay adjustment; horizontal sharpness adjustment, gamma correction; noise rejection and so on, on RGB signals provided by the image signal processing section 20 and sends the processed RGB signals to the liquid crystal module 50 as image data via an low voltage differential signal (LVDS) interface and so on. It goes without saying that the image quality adjustment section 30 can send the RGB signals to the liquid crystal module 50 without performing image quality adjustment on the RGB signals.

The liquid crystal module 50 is equipped with a liquid crystal display drive circuit, a liquid crystal display panel, and a back light (they are not shown in FIG. 1). The liquid crystal display drive circuit generates voltages to drive each panel corresponding to R, G, or B signals of the liquid crystal display panel. Supplied with a high voltage by an inverter (not shown in FIG. 1), the back light lights and illuminates the liquid crystal display panel from behind. In this way, the liquid crystal module 50 displays the images based on the image data on the liquid crystal display panel.

Figure 2:
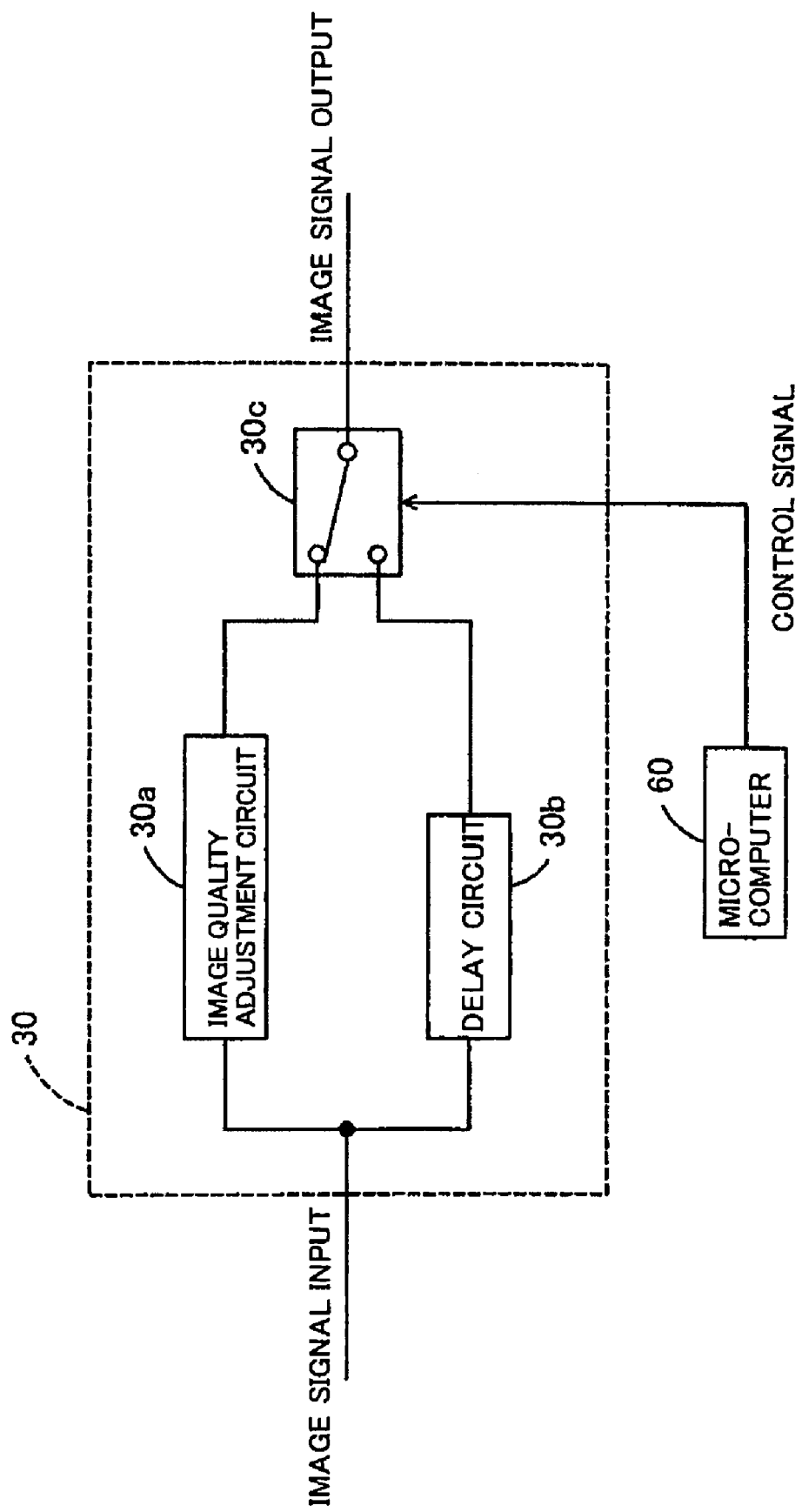
FIG. 2 is an exemplary illustration of a block schematic diagram of an image quality adjustment section.

Next, the constitution of the image quality adjustment section 30 will be described with reference to FIG. 2. The image quality adjustment section 30 includes an image quality adjustment circuit 30a, a delay circuit 30b, and a switch 30c. Being under the control of the microcomputer 60, the image quality adjustment circuit 30a performs a specified image quality adjustment on input image signals and outputs the adjusted image signals. Being under the control of the microcomputer 60, the delay circuit 30b performs delay processing on input image signals. In other words, the delay circuit 30b outputs input image signals when a specified time elapses since the input of the image signals without performing an image adjustment on the input image signals.

The specified time is a time needed for the image quality adjustment circuit 30a to perform image quality adjustment processing on the input image signals. For example, when brightness adjustment is performed in the image quality adjustment circuit 30a, the time for about 1 clock is needed for the brightness adjustment. Therefore the specified time in this case is the time for about 1 clock because the delay time of about 1 clock is generated between the input of the image signals and the output of the image signals. When noise rejection is performed in the image quality adjustment circuit 30a, about the time for 2 frames to be displayed is needed for the noise rejection because it is necessary for the noise rejection to compare images of the current frame with those of the preceding frame. Therefore the specified time in this case is about the time for 2 frames to be displayed because the delay time generated in the image quality adjustment circuit 30a is about the time for 2 frames to be displayed.

The switch 30c switches between the image quality adjustment circuit 30a and the delay circuit 30b so that image signals are input to either of the circuits according to the control of the microcomputer 60. The microcomputer 60 issues a control signal for the switch 30c to connect to the delay circuit 30b when input signals to the image quality adjustment section 30 is for the OSD display area, and issues a control signal for the switch 30c to connect to the image quality adjustment circuit 30a when input signals to the image quality adjustment section 30 is for the area other than the OSD display area.

As mentioned above, the image quality adjustment circuit 30a constitutes the image quality adjustment circuit that performs a specified image quality adjustment processing on image signals output from the image signal output unit; the delay circuit 30b constitutes the delay output circuit that delays the image signals by the time needed for the image quality adjustment circuit to perform image quality adjustment processing without performing any image quality adjustment on the image signals; and the switch 30c constitutes a switching device that switches between the image quality adjustment circuit and the delay output circuit so that image signals are input to either of the circuits according to discrimination signals output from a rectangle discrimination unit.

Figure 3:
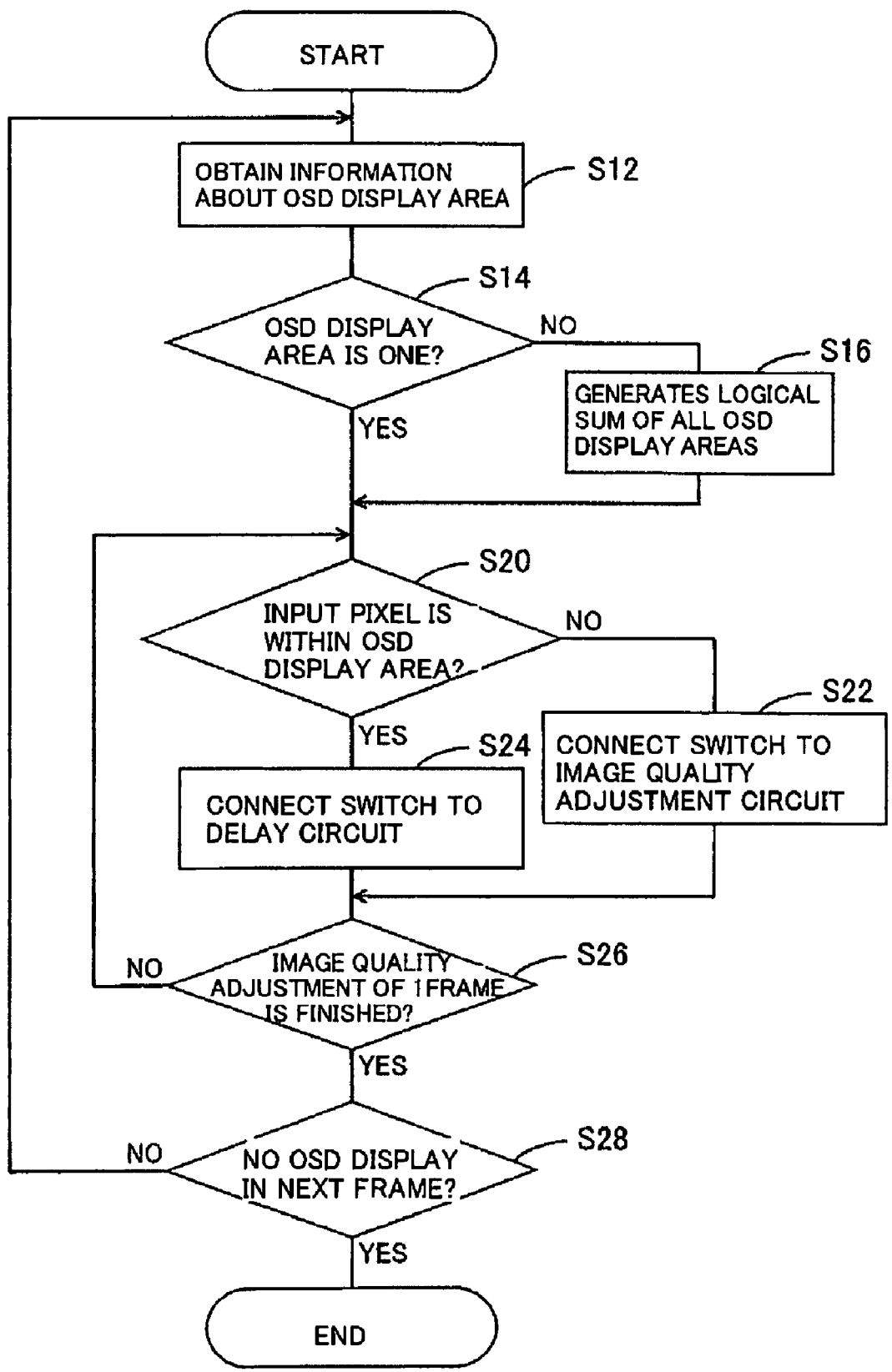
FIG. 3 is an exemplary illustration of a flow chart of the image quality adjustment processing.

(2) Image Quality Adjustment Processing:

Processing where the microcomputer 60 controls the image quality adjustment section 30 will be described below with reference to FIG. 3. FIG. 3 is a flow chart showing the processing. This flow is performed every time the microcomputer 60 orders the OSD processing section 20e to display OSDs.

Figure 4:
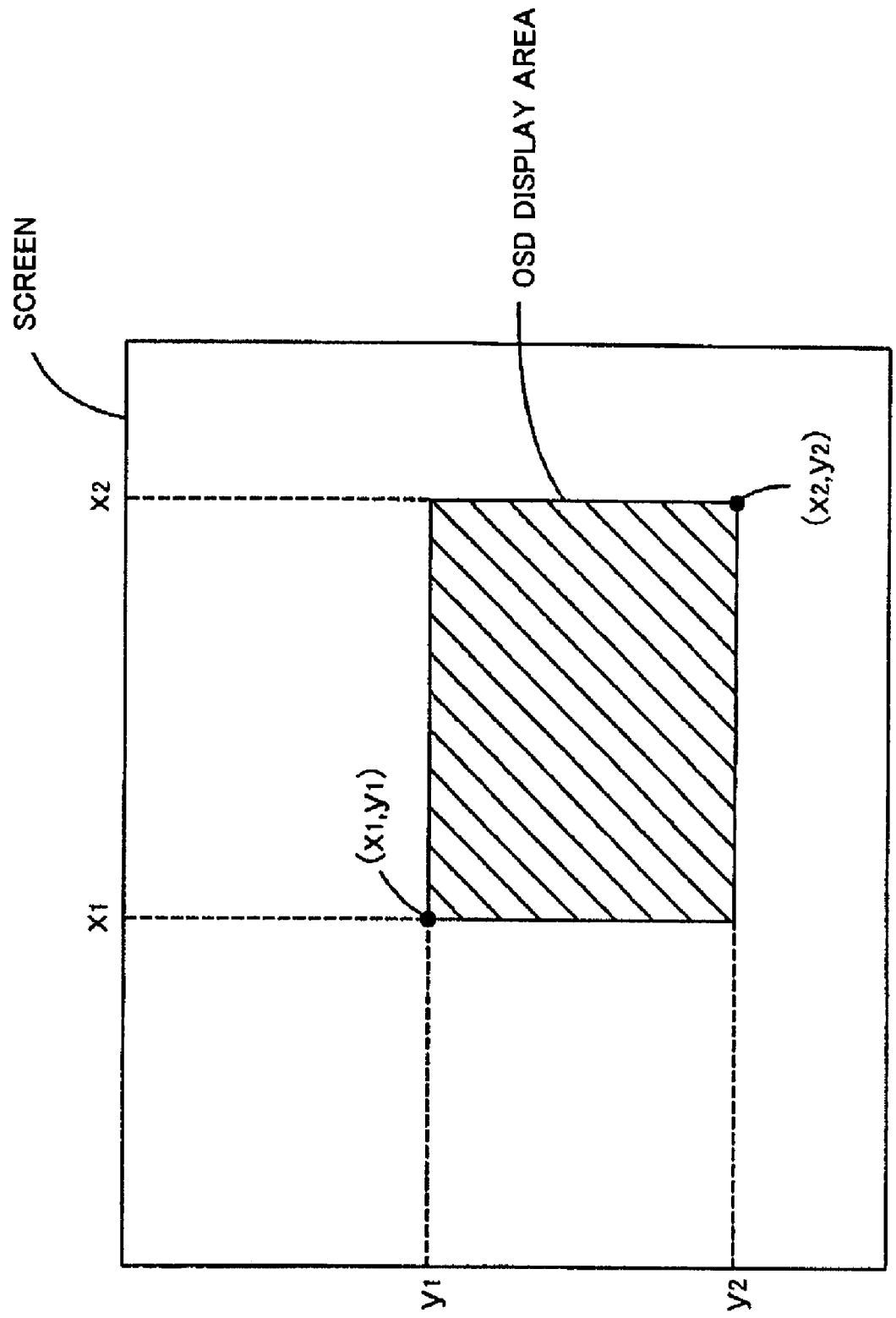
FIG. 4 is an exemplary illustration of one example of an OSD display screen.
Figure 5:
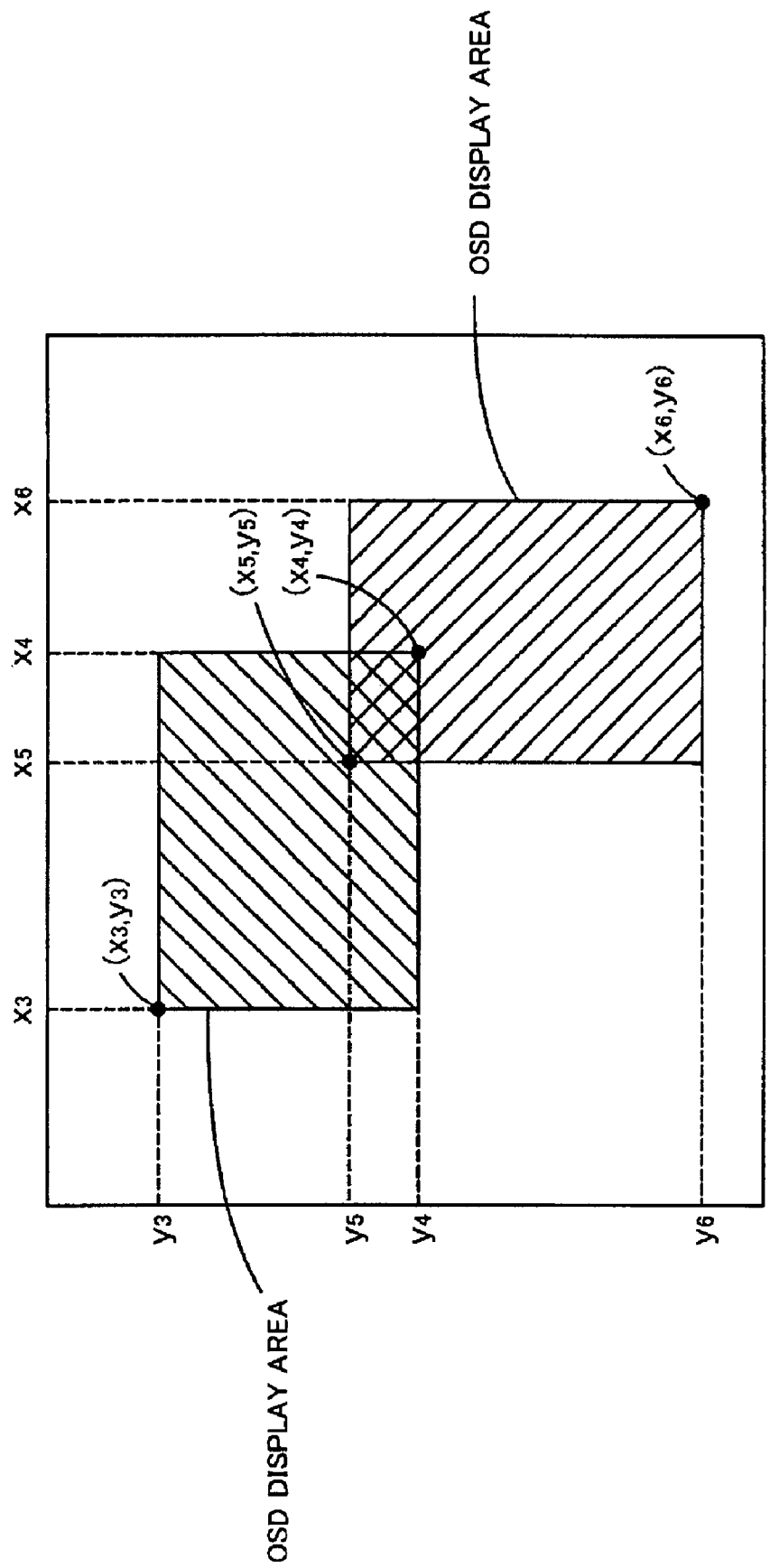
FIG. 5 is an exemplary illustration of another example of an OSD display screen.
Figure 6:
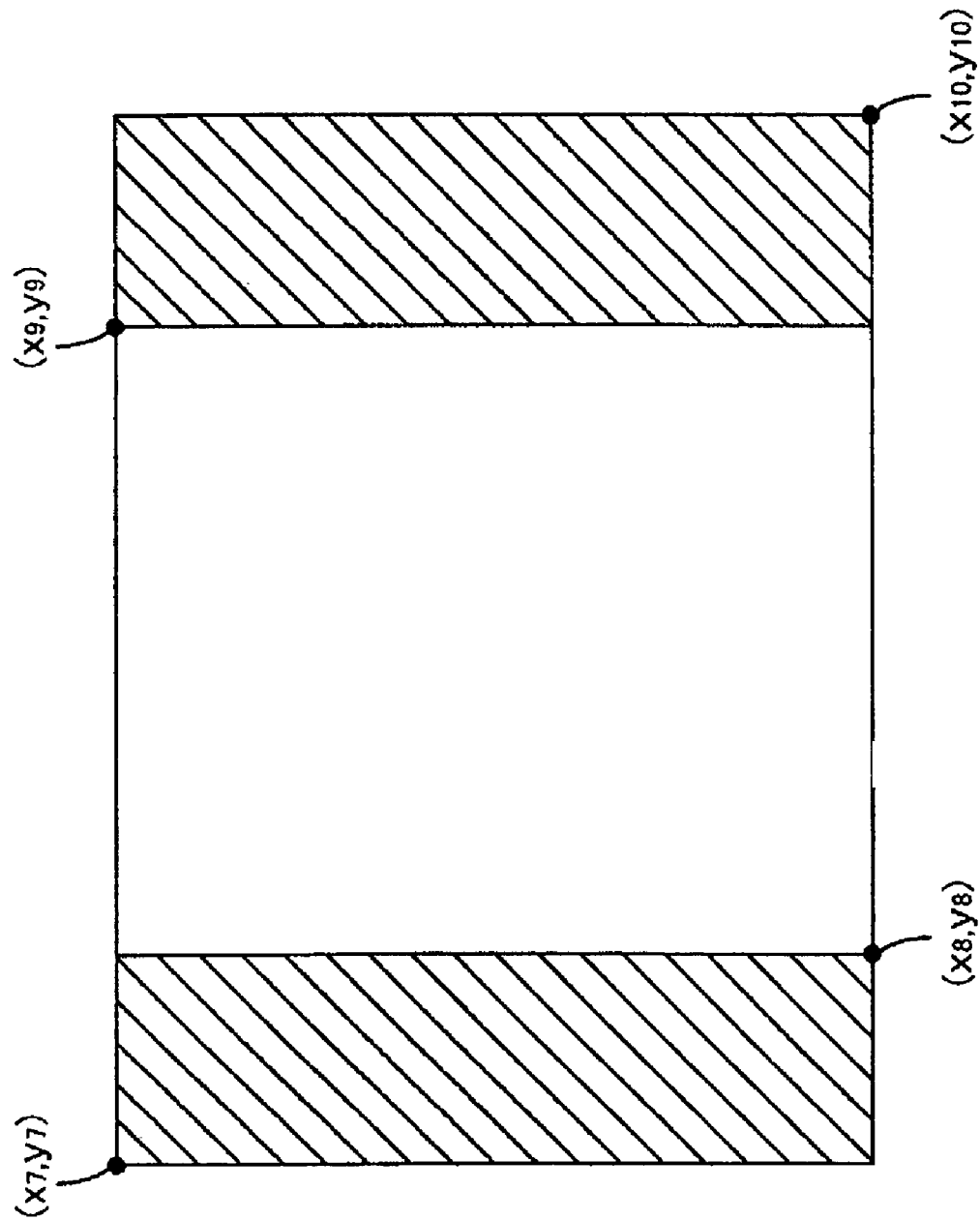
FIG. 6 is an exemplary illustration of another example of an OSD display screen.
Figure 7:
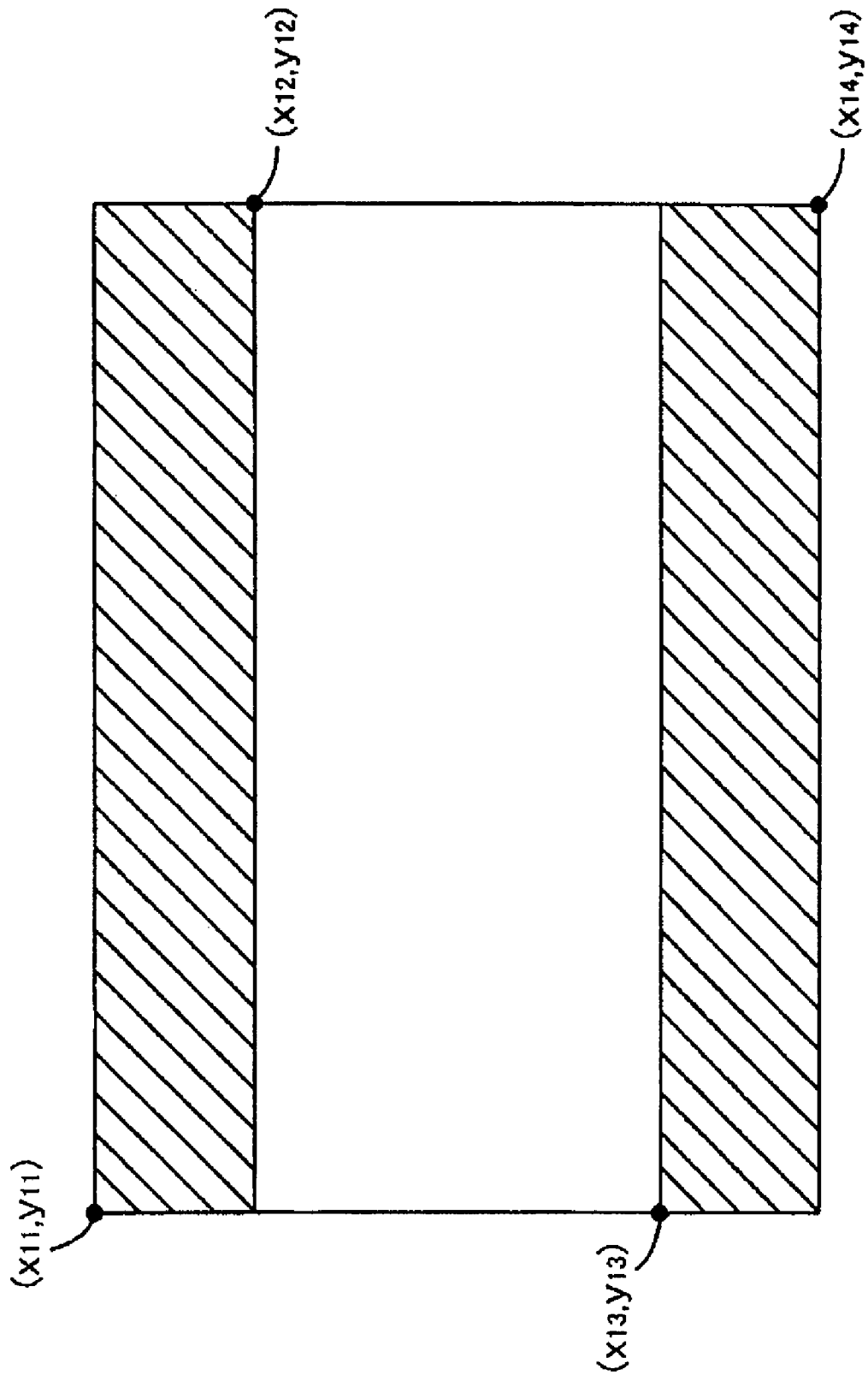
FIG. 7 is an exemplary illustration of another example of an OSD display screen.

FIG. 4 and FIG. 5 show examples of screens where OSDs are displayed. FIG. 4 shows a screen where one OSD is displayed, while FIG. 5 is a screen where two OSDs are displayed. FIG. 6 shows a screen with black masked portions on both right and left sides, while FIG. 7 shows a screen with black masked portions on both upper and lower sides.

In this embodiment, OSDs that have been superimposed in the OSD processing section 20e are surrounded by rectangular boxes. Menu screens, black masked portions that appear on both right and left sides when images with aspect ratio of 4 to 3 are displayed on screens for images with aspect ratio of 16 to 9, and black masked portions that appear on both upper and lower sides when images with aspect ratio of 16 to 9 are displayed on screens for images with aspect ratio of 4 to 3 are displayed inside the rectangular boxes. A virtual rectangular box to show that the internal area of the box is an OSD display area is sufficient to serve as the above-mentioned rectangular box. It is not always necessary that the rectangular box has a width. Here, the black masked portions on both right and left sides constitutes non-image areas of both right and left sides of the image display area, and the black masked portions on upper and lower sides constitutes non-image areas of upper and lower sides of the image display area.

At the beginning of the image quality adjustment processing, information about the OSD display area is obtained at Step S12. The information about the OSD display area shown in FIG. 4 is, for example, the coordinates of the upper left corner and the coordinates of the lower right corner of the rectangular box displayed on the screen. In other words, assuming that the coordinates have the upper left corner of the screen as the origin, the rightward direction as the positive direction of x-axis, and downward direction as the positive direction of y-axis, it is possible to specify the area inside the rectangular box by giving the coordinates of the start point (x1, y1) to the upper left corner of the rectangular box and the coordinates of the end point (x2, y2) to the lower right. As a result, the OSD display area of FIG. 4 is expressed by the following two inequalities:

$$x1 < x < x2$$

$$y1 < y < y2$$

Next, the judgment as to whether one OSD exist in the screen will be made. If the image signal is determined to include an OSD, the flow proceeds to Step S18. On the other hand, as shown in FIG. 5, if the OSD signal to show the existences of multiple OSDs on the screen is included in the image signal, the flow proceeds to Step S16. At Step S16, the information about the OSD display area, that is, the information about the logical sum of multiple OSD display areas is generated.

In this case, it goes without saying that as long as the judgment as to whether one OSD or multiple OSDs exist on the screen or not can be made, any way to make the judgment will do. One of the ways to discriminate OSD display areas can be configured in such a way that an exclusive logical sum of the original multiple OSD display areas and a logical product of the original multiple OSD display areas are respectively discriminated as the OSD display areas. Or another way can be configured in such a way that the multiple rectangular areas surrounded by multiple rectangular boxes that are generated after the original multiple OSD display areas being divided are respectively discriminated as the OSD display areas. If FIG. 5 is taken as an example of the latter case, the OSD display areas shown in FIG. 5 are expressed by the following three pairs of inequalities:

$$x3 < x < x4, y3 < y < y5 \quad \text{First rectangular area}$$

$$x3 < x < x6, y5 < y < y4 \quad \text{Second rectangular area}$$

$$x5 < x < x6, y4 < y < y6 \quad \text{Third rectangular area}$$

When only one OSD exists on the screen at Step S14 or after the processing at Step S16 is finished, the flow proceeds to Step S20. Then at Step S20, if only one OSD exists on the screen at Step S14, the area where the corresponding pixel of the image signal is displayed is judged based on the information about the OSD display area obtained at Step S12. If multiple OSDs exist on the screen at Step S14, the area where each pixel of the image signal is displayed is judged based on the information about OSD display area obtained at Step S16. And at the same time the judgment as to whether the pixel of the image signal should be input to the image quality adjustment circuit 30a or the delay circuit 30b is made.

At Step S20, if the pixel of the input image signal is for an OSD display area, the flow proceeds to Step S24, and the control signal to order the switch 30c to connect to the delay circuit 30b is issued. As a result, the delay circuit 30b delays the pixel of the image signal by a specified time, and sends the pixel to the latter stage.

At Step S20, if the pixel of the input image signal is not for an OSD display area, the flow proceeds to Step S22, and the control signal to order the switch 30c to connect to the image quality adjustment circuit 30a is issued. As a result, the image quality adjustment circuit 30a performs a specified image quality adjustment on the pixel of the image signal, and sends the pixel to the latter stage.

The microcomputer 60 that controls the above-mentioned processing of Step S12 to Step S20 constitutes the rectangle discrimination unit that discriminates between image signals to be displayed inside a specified rectangular area on the panel-type display and image signals to be displayed outside the specified rectangular area and also outputs discrimination signals. The control signal that is issued to the switch 30c by the microcomputer 60 is the discrimination signal.

After Step S24 or Step S22 is completed, the judgment as to whether all the image signals for one frame have been processed in the image quality adjustment section 30 or not is made at Step S26. If all the image signals for one frame have been processed in the image quality adjustment section 30, the flow proceeds to Step S28. If all the image signals for one frame have not been processed in the image quality adjustment section 30, the flow proceeds to Step S20 and the processing of Step S20 to Step S26 is repeated.

At Step S28, the judgment as to whether there is an OSD in the next frame or not is made. In other words, whether the microcomputer 60 has ordered the OSD processing section 20e to display an OSD in the next frame or not is judged. If the OSD processing section 20e has not been ordered to display an OSD, the image quality adjustment processing ends. If the OSD processing section 20e has been ordered to display an OSD, the flow proceeds to Step S12 and the processing of Step S12 to Step S28 is repeated.

The behaviors of this embodiment that is configured in the above-mentioned way will be described below. Receiving OSD display instructions to display a menu and so on from the operation panel 75 or the remote control signal receiving section and so on, the microcomputer 60 orders the OSD processing section 20e to generate OSD signals and superimpose the OSD signals onto image signals, and at the same time begins to control the image quality adjustment section 30.

Firstly, the OSD processing section 20e generates OSD signals and superimposes the OSD signals onto the image signals output from the scaler 20d. Then the image signals with the OSD signals superimposed thereon are sent to the image quality adjustment section 30.

The microcomputer 60 switches the switch 30c back and forth in exact timing with image signals input to the image quality adjustment section 30. As a result, the image signals corresponding to the pixels with the OSD signals superimposed thereon are sent to the delay circuit 30b and the image signals corresponding to the pixels without the OSD signals superimposed thereon are sent to the image quality adjustment circuit 30a.

Therefore, color adjustments such as contrast adjustment, tint adjustment, brightness adjustment, and flesh tone correction; black and white extension adjustment; delay adjustment; horizontal sharpness adjustment, gamma correction; noise rejection and so on are performed on the image signals of the pixels without the OSD signals superimposed thereon. As a result, the processed image signals with users' favorite image qualities taken into consideration are displayed on the screen. On the other hand, the image signals of the pixels with the OSD signals superimposed thereon are displayed on the screen with the image qualities based on data to generate OSDs input by the microcomputer 60.

It takes a specified time for the image signals of the pixels without OSD signals superimposed thereon to be adjusted by the image quality adjustment circuit, while it also takes the same time for the image signals of the pixels with OSD signals superimposed thereon to go through the delay circuit. Therefore, the sequence of the pixels is maintained because it takes the same time for all the image signals of the pixels to go through the image quality section. As a result, normal images are displayed on the screen.

Figure 8:
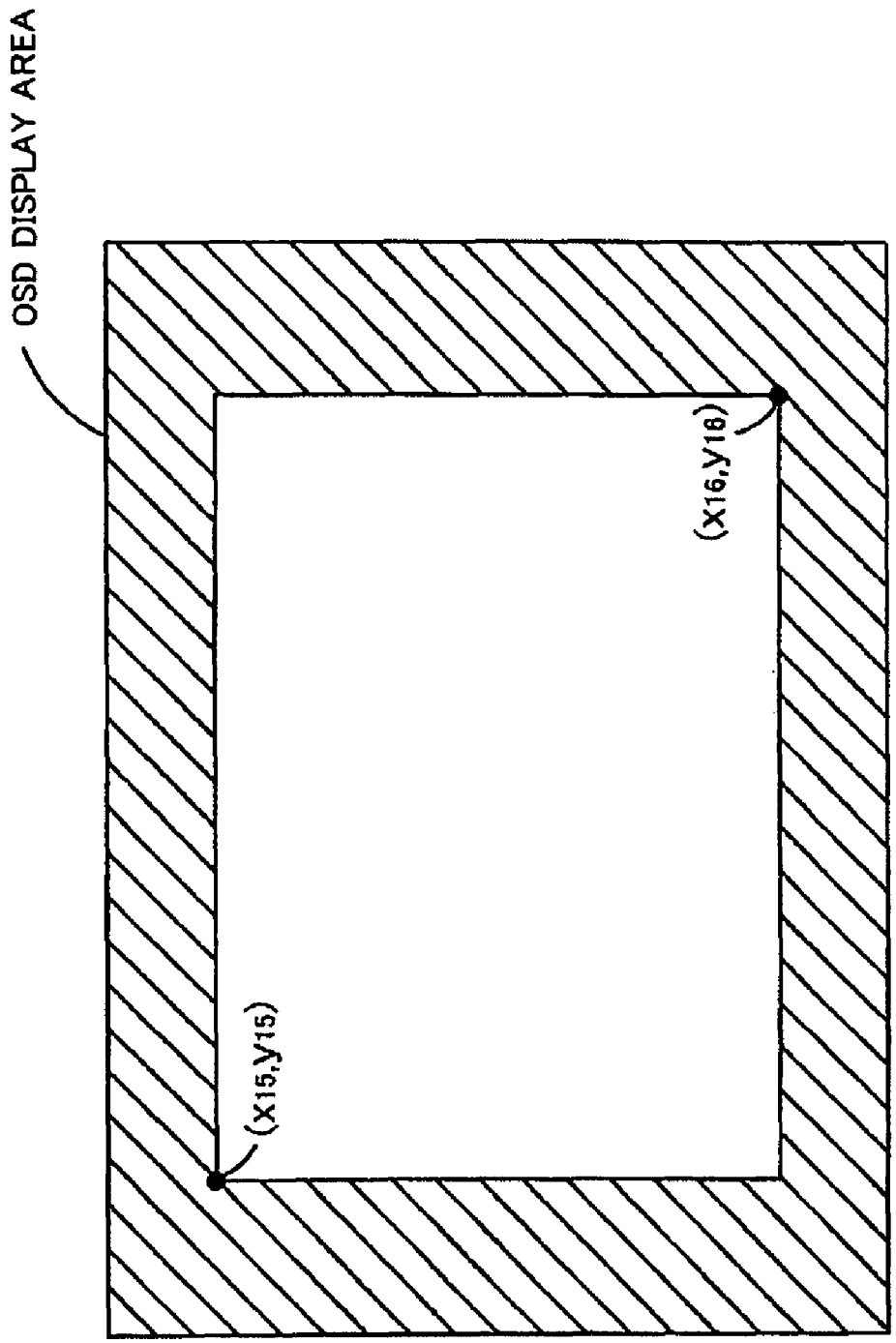
FIG. 8 is an exemplary illustration of another example of an OSD display screen.

(3) A Modified Example Related to the Image Quality Adjustment Processing:

Not only the above-described way to discriminate an OSD display area by use of a rectangular box, but also another way to discriminate an image area where OSDs are not displayed by use of a rectangular box can be thought up. In other words, in the case where an image display area is surrounded on all four sides by black masked portions as shown in FIG. 8, the way where the black masked portions are not discriminated as a set of rectangular boxes, but the image display area is discriminated as a rectangular box can be thought of. It goes without saying that the above-mentioned way to discriminate an image display area can be applied not only to the case where an image display area is surrounded on all four sides by black masked portions, but also to the case shown in FIG. 4 to FIG. 7

Figure 9:
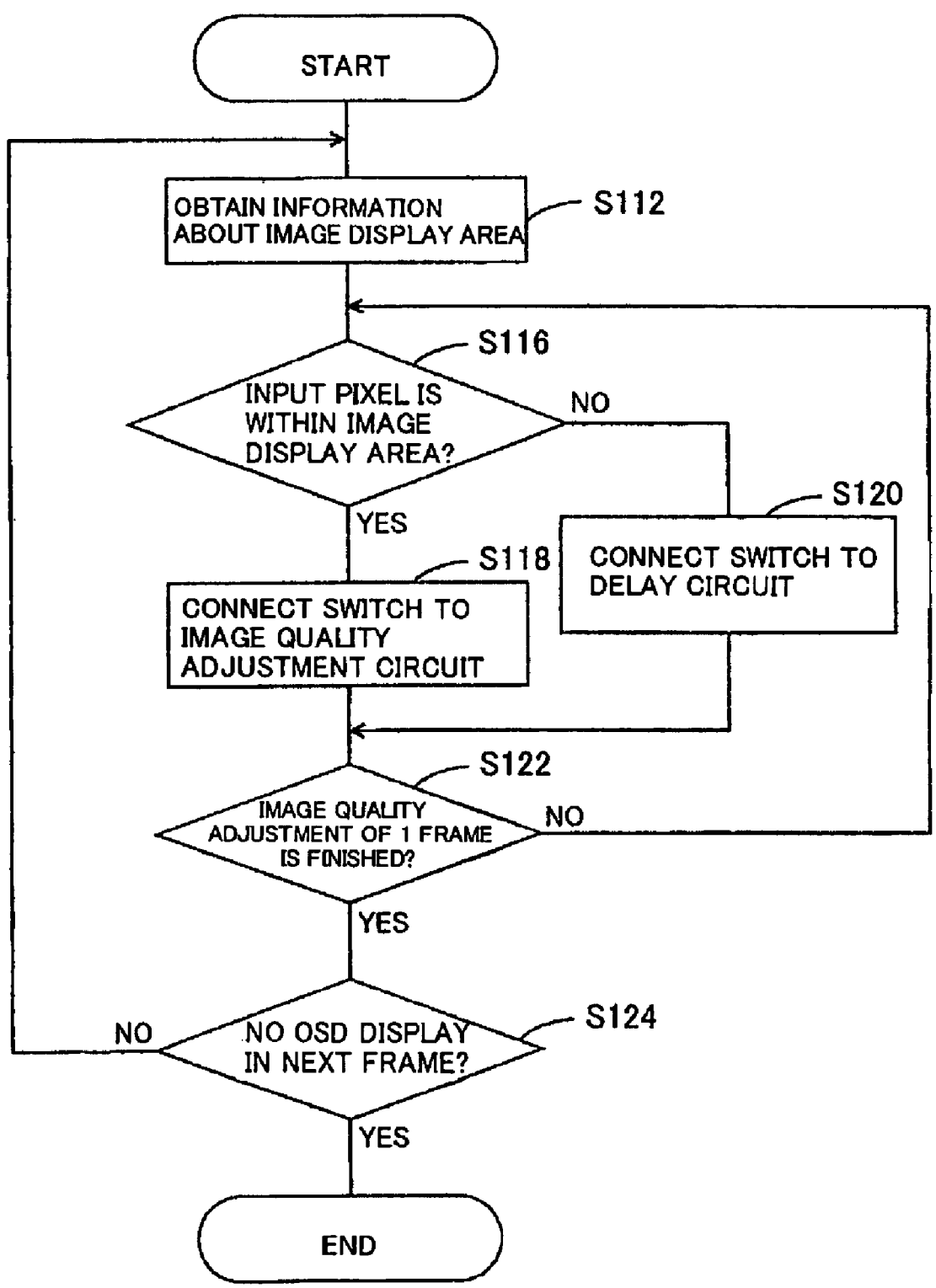
FIG. 9 is an exemplary illustration of a modified example of the flow chart of the image quality adjustment processing.

The processing for the microcomputer 60 to control the image quality adjustment section 30 in the case where an image display area is discriminated as a rectangular area will be described below with reference to FIG. 9. FIG. 9 is a flow chart showing this processing. This flow is performed every time the microcomputer 60 orders the OSD processing section 20e to display OSDs. In this modified example, it is assumed that areas other than OSD display areas, that is, image display areas are surrounded by rectangular boxes and that images are displayed inside the rectangular boxes.

At the beginning of the image quality adjustment processing, information about image display area is obtained at Step S112. The information about the image display area shown in FIG. 8 is, for example, the coordinates of the upper left corner and the coordinates of the lower right corner of the rectangular box displayed on the screen. In this case, it is assumed that the coordinates have the upper left corner of the screen as the origin, the rightward direction as the positive direction of x-axis, and downward direction as the positive direction of y-axis. It is possible to specify the area inside the rectangular box as the image display area by giving the coordinates (x15, y15) to the upper left corner of the rectangular box and the coordinates (x16, y16) to the lower right. As a result, the image display area of FIG. 8 is expressed by the following two inequalities:

$$x15 < x < x16$$

$$y15 < y < y16$$

At Step S116, the judgment as to whether each pixel of image signals to be input to the image quality adjustment section 30 should be input to the image quality adjustment circuit 30a or to the delay circuit 30b is made using the information about image display area obtained at Step S112. If the pixel of the input image signals is for an image display area, the flow proceeds to Step S118, and the microcomputer 60 issues the control signal to order the switch 30c to connect to the image quality adjustment circuit 30a. As a result, the image quality adjustment circuit 30a performs the image quality adjustment on the image signals, and sends the adjusted image signals to the latter stage.

If the pixel of the input image signals is not for an image display area, the flow proceeds to Step S120, and the microcomputer 60 issues the control signal to order the switch 30c to connect to the delay circuit 30c. As a result, the delay circuit 30b delays the image signals by a specified time, and sends the delayed signals to the latter stage.

The microcomputer 60 that controls the above-mentioned processing of Step S112 to Step S116 constitutes the rectangle discrimination unit that discriminates between image signals to be displayed inside a specified rectangular area on the panel-type display and image signals to be displayed outside the specified rectangular area and also outputs discrimination signals. Control signals that are issued to the switch 30c by the microcomputer 60 are the discrimination signals.

After Step S118 or Step S120 is completed, the judgment as to whether all the image signals for one frame have been processed in the image quality adjustment section 30 or not is made at Step S122. If all the image signals for one frame have been processed in the image quality adjustment section 30, the flow proceeds to Step S124. If all the image signals for one frame have not been processed in the image quality adjustment section 30, the flow proceeds to Step S116 and the processing of Step S116 to Step S122 is repeated.

At Step S122, the judgment as to whether there is an OSD in the next frame or not is made. In other words, whether the microcomputer 60 has ordered the OSD processing section 20e to display an OSD in the next frame or not is judged. If the OSD processing section 20e has not been ordered to display an OSD, the image quality adjustment processing ends. If the OSD processing section 20e has been ordered to display an OSD, the flow proceeds to Step S112 and the processing of Step S112 to Step S124 is repeated.

(4) Summary:

The present invention relates to a panel-type image display device and a liquid crystal television that includes an image quality adjustment circuit 30a that performs a specified image quality adjustment processing on input image signals; a delay circuit 30b that delays input image signals by the time needed for the image quality adjustment circuit 30a to perform image quality adjustment processing; and a switch 30c that switches between the image quality adjustment circuit 30a and the delay circuit 30b so that image signals are input to either of the circuits according to the control of a microcomputer 60, wherein the microcomputer 60 inputs image signals for OSD display areas to the delay circuit 30c and image signals other than those for OSD display areas to the image quality adjustment circuit 30a.

As mentioned above, the microcomputer 60 that controls the processing of Step S12 to Step S20 and the processing of Step S112 to Step S116 constitutes the rectangle discrimination unit that discriminates between image signals to be displayed inside a specified rectangular area on the panel-type display and image signals to be displayed outside the specified rectangular area and also outputs discrimination signals.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A liquid crystal television comprising:
   a liquid crystal module that displays images on a screen of the liquid crystal module;
   a tuner that extracts TV broadcast signals of a channel selected from a TV broadcast signals received by an antenna and outputs the extracted signals;
   a scaler large scale integration (LSI) equipped with: a decoder that separates image signals and audio signals from input TV signals, and simultaneously decodes the image signals and extracts amounts of three primary color signal components, that is, amounts of R (red), G (green), and B (blue) components; a scaler that generates image data for one frame to be displayed in the liquid crystal module after performing scaling processing on input image signals in order to match the input image signals to a pixel number of the screen of the liquid crystal module; and an on-screen display (OSD) processing section that generates still images and superimposes the still images onto image signals after being supplied with data used to generate OSD signals;
   an image quality adjustment circuit that performs a specified image quality adjustment processing on the image signals input by the scaler LSI, and outputs the processed image signals to the liquid crystal module; and
   a microcomputer that controls the tuner, the scaler LSI, and the liquid crystal module, and simultaneously supplies an OSD processing section with data used to generate OSD signals,
   the liquid crystal television further including:
   a delay circuit that delays the image signals output by the scaler LSI by a time needed for the image quality adjustment circuit to perform image quality adjustment processing; and
   a switch that switches a connection between the image quality adjustment circuit and the delay circuit according to a control of the microcomputer so that the image signals are output from either of the image quality adjustment circuit or the delay circuit,
   the OSD processing section generates OSD signals used to display rectangular OSDs on the screen after being supplied with data used to generate OSD signals by the microcomputer and outputs the OSD signals superimposed onto the image signals; and
   the microcomputer generates information about OSD display area from a data used to generate the OSD signals after controlling the OSD processing section in order for OSDs to be displayed; controls the switch in order for the delay circuit to be connected so that the image signals for OSD display areas of the signals output by the scaler LSI are output without qualities of the image signals being adjusted; controls the switch in order for the image quality adjustment circuit to be connected so that the image signals that are not for the OSD display areas are output with the qualities of the image signals being adjusted; and displays the OSD images without the qualities of the image signals being adjusted and the images other than the OSD images with qualities of the image signals being adjusted on the screen of the liquid crystal module.

* * * * *